(12) United States Patent
Xin

(10) Patent No.: US 10,154,154 B2
(45) Date of Patent: Dec. 11, 2018

(54) CENTRALIZED THEFT-PROOF DEVICE

(71) Applicant: HANGZHOU LANGHONG TECHNOLOGY CO., LTD., Hangzhou (CN)

(72) Inventor: Hong Xin, Hangzhou (CN)

(73) Assignee: Hangzhou Langhong Technology Co., Ltd., Hangzhou, Zheijang (CN)

( * ) Notice: Subject to any disclaimer, the term of this patent is extended or adjusted under 35 U.S.C. 154(b) by 0 days.

(21) Appl. No.: 15/688,827

(22) Filed: Aug. 28, 2017

(65) Prior Publication Data

US 2018/0063337 A1    Mar. 1, 2018

(30) Foreign Application Priority Data

Aug. 29, 2016    (CN) ...................... 2016 2 0984317 U

(51) Int. Cl.
*H04M 19/08*    (2006.01)

(52) U.S. Cl.
CPC .................... *H04M 19/08* (2013.01)

(58) Field of Classification Search
CPC .................................................... H04M 19/08
USPC ...................................................... 340/568.1
See application file for complete search history.

(56) References Cited

U.S. PATENT DOCUMENTS

| | | | | |
|---|---|---|---|---|
| 4,803,702 A * | 2/1989 | Chen | ......................... | G06F 1/12 370/503 |
| 6,150,923 A * | 11/2000 | Johnson | ................... | G08B 3/10 340/384.1 |
| 8,538,494 B2 * | 9/2013 | Hsu | ........................ | H04M 19/08 320/107 |
| 8,922,372 B2 * | 12/2014 | Soffer | ................ | G06F 13/4068 340/568.1 |
| 9,019,838 B2 * | 4/2015 | Austermann, III | ...... | H04B 3/54 340/568.1 |
| 9,473,648 B2 * | 10/2016 | Zhao | ........................ | H01H 7/00 |
| 2010/0060242 A1 * | 3/2010 | Parish | ................... | H04M 19/08 320/162 |

* cited by examiner

*Primary Examiner* — Qutbuddin Ghulamali
(74) *Attorney, Agent, or Firm* — Liang Legal Group, PLLC

(57) ABSTRACT

A centralized theft-proof device includes a main control, several sub-controls, and optionally a remote control. The main control includes a process, a display, a wireless receiver, and an alarm, and each sub-control includes a SCM and several interfaces connected to the SCM. The processor and SCM are in series connection. The processor is electrically connected to the display, the wireless receiver, and the alarm, respectively. The main control is connected to at least one adapter, and each sub-control is connected to at least one adapter.

8 Claims, 4 Drawing Sheets

CENTRALIZED THEFT-PROOF DEVICE

CROSS REFERENCE TO RELATED APPLICATIONS

This claims the priority of Chinese Patent Application No. 201620984317.8, filed on Aug. 29, 2016, the disclosure of which is incorporated by reference in its entirety.

Field of the Invention

This invention relates to the technical field of digital exhibition theft-proof equipment, particularly to a centralized theft-proof device featuring easy installation, space saving, and centralized control.

Background Art

Conventional digital exhibition theft-proof equipment can monitor only one digital product, which requires more power adapters and controls for monitoring numerous digital products. As a result, it has disadvantages such as complicated wiring, inconvenient installation, excessive space requirement, and high exhibition costs.

SUMMARY OF THE INVENTION

An objective of this invention is to overcome some or all disadvantages in the prior art, such as high exhibition costs and inconvenient installation of current digital exhibition theft-proof equipment, and to provide a centralized theft-proof or theft-prevention device, featuring easy installation, space saving, and centralized control. In this description, the term "theft-proof," "theft-prevention," "anti-theft," and "theft-deterrent" may be used interchangeably.

To achieve above-mentioned objective, embodiments of the present invention make use of the following technical solutions:

A centralized theft-proof device may comprise a main control, several sub-controls and a remote control. The main control may comprise a processor, a display, a wireless receiver, and an alarm. Each of the sub-controls may comprise a single chip microcomputer (SCM) and several interfaces electrically connected with the SCM. The processor and SCM are connected in series. The processor is electrically connected individually with the display, the wireless receiver, and the alarm. The main control connects with at least one adapter, and each of the sub-controls connects with at least one adapter.

The invention makes use of one main control to control one or more sub-controls. The main control may provide power to the sub-controls successively (in series) via the data wires. Power supply to the electronic/digital products may be provided by an adapter of each sub-control to facilitate high-current charging. Furthermore, the main control can display status of each sub-control.

Embodiments of the invention can save space and resources, as well as can realize centralized management of multiple sub-controls connected with multiple adaptors.

Therefore, embodiments of the invention have characteristics of easy installation, space saving, and centralized control.

In a preferred embodiment, any interface (connector) of the sub-control may directly connect with a display product via a charging wire or charging cable (i.e., may also function as an anti-theft cable/wire), which can function to prevent theft and to charge the display product.

In a preferred embodiment, any interface (connector) of the sub-control may connect with a display base (which may also be a charging stand) via a wire or cable (i.e., a charging cable/anti-theft cable). Then, a display product is connected to a connector on the display base via another wire or cable. The connector on the display base (charging stand) connects with the charging cable (or anti-theft cable).

In a preferred embodiment, each sub-control comprises a charging line detection circuit. The charging line detection circuit comprises resistors R6 and R7, and a capacitor C5. The resistor R7 is electrically connected to one terminal of resistor R6 and one terminal of capacitor C5, respectively. The other terminal of capacitor C5 is grounded. The other terminal of resistor R6 connects with a power source. The junction of resistor R6 and resistor R7 is connected with the SCM of the sub-control. The junction of resistor R7 and capacitor C5 is connected to a charging line/cable.

In a preferred embodiment, each sub-control further comprises a charging status indication circuit. The charging status indication circuit comprises an LED1, an LED2, a resistor R1, a resistor R5, a MOSFET N and a MOSFET P. Poles S of both MOSFET N and MOSFET P are grounded. The two terminals of LED1 are respectively connected with one terminal of resistor R1 and pole D of MOSFET N. The two terminals of LED2 are respectively connected with one terminal of resistor R5 and pole D of MOSFET P. The resistors R1 and R5 are connected to a power source. Pole G of MOSFET P is connected to pole G of MOSFET N and then connects with a charging line.

In a preferred embodiment, each sub-control comprises a charging control circuit 7, which comprises a resistor R22, an IRF7103 chip U6, an IRF7103 chip U7, and an adapter interface J13. One terminal of resistor R22 is grounded. The adapter interface J13 comprises pins 1, 2 and 3. Pins 2 and 3 are short connected and then connected with pins 5 to 8 of IRF7103 chips U6 and U7. Pin 1 of adapter interface J13 is connected to a power source (e.g., a 5V power source). Pins 1 and 3 of IRF7103 chips U6 and U7 are grounded. The other terminal of resistor R22 and pins 2 and 4 of IRF7103 chips U6 and U7 connect with the data wire/cable.

In a preferred embodiment, the charging stand 9 is provided with a groove. An electrode assembly is provided in the groove. The electrode assembly is electrically connected with a display product via a mini plug. The charging line is connected to the electrode assembly.

In a preferred embodiment, on both sides of the groove of the charging stand are provided with cavities filled with roller balls, and both side walls of the groove are made of an elastic material.

When a display product of varied thicknesses are inserted into the groove, roller balls will fall down to tightly press against such digital products. And this invention is suitable for digitals products of different thicknesses.

In a preferred embodiment, the wireless receiver is a 2.4 G or REFID wireless receiver.

Therefore, the invention has such beneficial effects as saving space and resources, realizing centralized management of numerous multi-interface sub-controls, simultaneously monitoring numerous digital products and extensively applicable.

Figure 1:
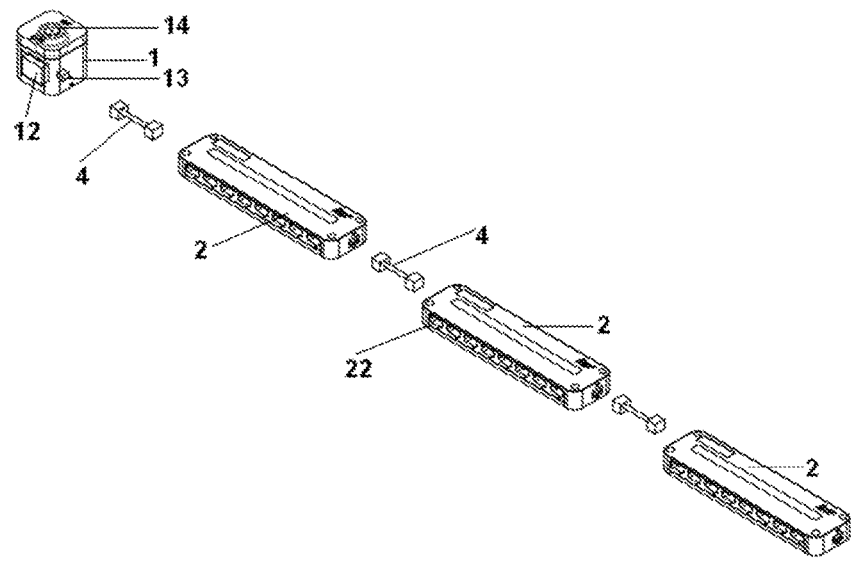
FIG. 1 shows a structural diagram of one embodiment of the invention.

In the figure: Main control 1, sub-control 2, remote control 3, adapter 4, charging line detection circuit 5, charging status indication circuit 6, charging control circuit 7, charging stand 9, USB interface 10, processor 11, display 12, wireless receiver 13, alarm 14, SCM 21, interface 22, groove 91, electrode assembly 911, mini plug 922 and mobile phone 15.

DETAILED DESCRIPTION

Figure 2:
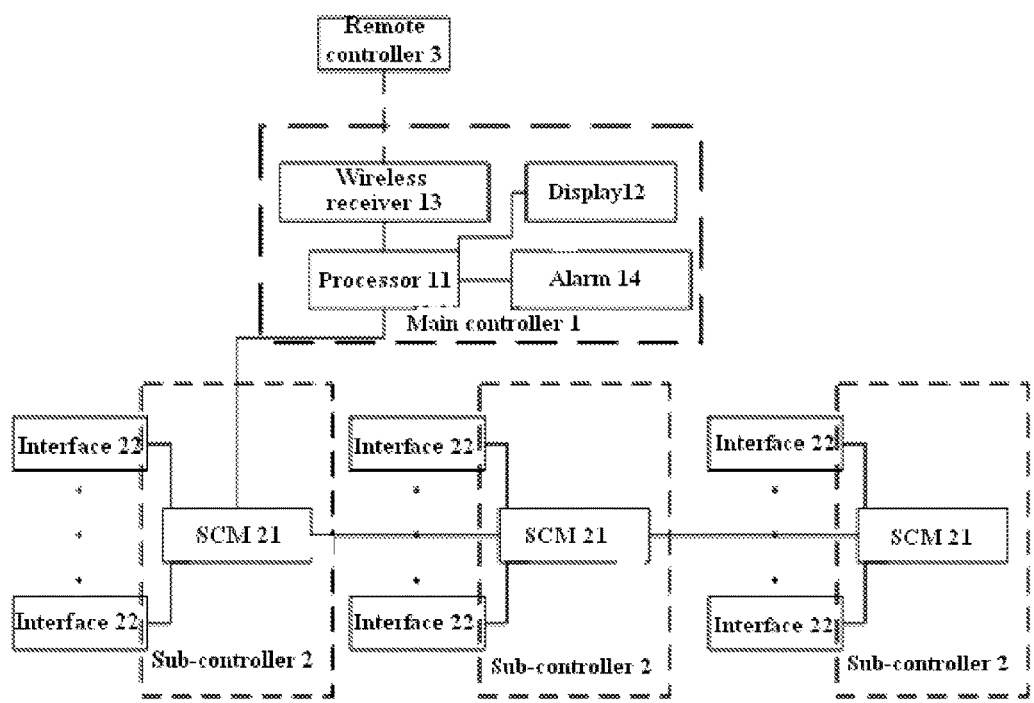
FIG. 2 shows a block diagram of one embodiment of the invention.

The invention is further described as follows in combination with drawings and specific embodiments:

An embodiment as shown in FIGS. 1 and 2 relates to a centralized theft-proof or theft-prevention device, which comprises a main control 1, 3 sub-controls 2, and optionally a remote control 3. The remote control 3 is optional because it is convenient to have, but not necessary for the function of the system. The main control comprises a processor 11, a display 12, a wireless receiver 13, and an alarm 14. Each sub-control comprises a SCM 21 and multiple (e.g., 4 pairs shown) interfaces 22 electrically connected to the SCM 21. The processor 11 is in series connection with all SCMs 21 and is electrically connected to the display 12, wireless receiver 13, and alarm 14, respectively. Adapters 4 are used to connect the main control 1 and each sub-control 2. AS shown in the example of FIG. 1, an adapter 4 connects between the main control 1 and the first sub-control 2, and then further adapters 4 connect between the sub-control 2 in series. Note that while this example shows that the main control 1 connects with one series of sub-controls 2. However, in some embodiments, the main control 1 may have multiple adapters 4 to connect multiple series of sub-controls 2.

In accordance with some embodiments of the invention, one of the interfaces 22 in sub-controls 2 may be used to connect a charging stand via a charging line, while another one is connected to the digital product (i.e., display product) via a data wire.

Figure 3:
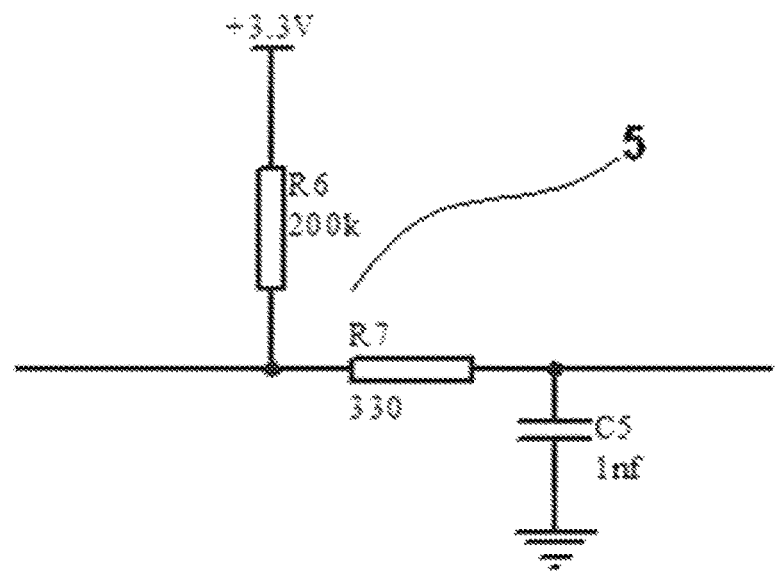
FIG. 3 shows a circuit diagram of a charging detection circuit of one embodiment of the invention.

As shown in FIG. 3, each sub-control 2 may comprise a charging line detection circuit (e.g., charging line detection circuit 5 shown in FIG. 3). In this example, the charging line detection circuit comprises resistor R6, resistor R7 and a capacitor C5. The terminals of resistor R7 are electrically connected to one terminal of resistor R6 and one terminal of capacitor C5, respectively. The other terminal of capacitor C5 is grounded, and the other terminal of resistor R6 is connected to a power source (a power source of 3.3V is shown in this example). The junction of resistor R6 and R7 is connected to SCM 21 of sub-control 2. The junction of resistor R7 and capacitor C5 is connected to poles G (gate) of MOSFET P and MOSFET N as is shown in FIG. 4.

Figure 4:
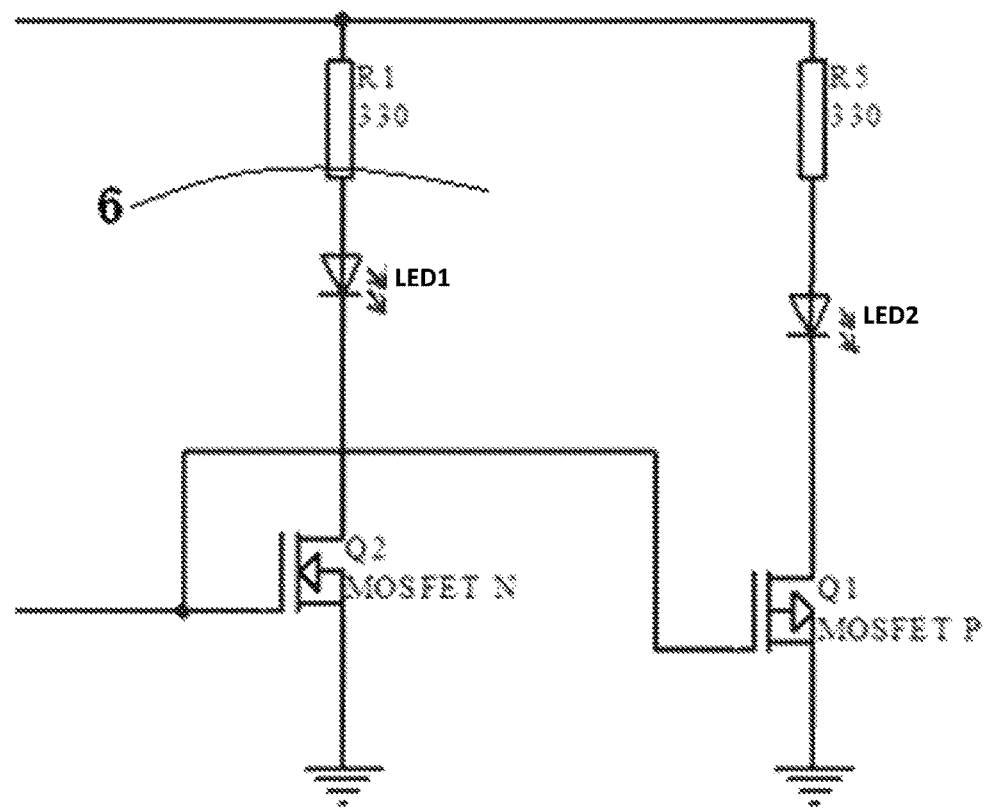
FIG. 4 shows a circuit diagram of a charging status indication circuit of one embodiment of the invention.

As shown in FIG. 4, each sub-control may further comprise a charging status indication circuit 6, which comprises an LED1, an LED2, a resistor R1, a resistor R5, a MOSFET N and a MOSFET P. Poles S (source) of both MOSFET N and MOSFET P are grounded. The terminals of LED1 are respectively connected to one terminal of resistor R1 and pole D (drain) of MOSFET N. The terminals of LED2 are respectively connected to one terminal of resistor R5 and pole D of MOSFET P. Resistors R1 and R5 are connected to a power source (e.g., a 5V power source). Pole G of MOSFET P is connected to pole G of MOSFET N and then to a charging line that connects with the shell of a digital product.

When no digital product is connected, the pin connected to SCM as shown in FIG. 3 detects a high electrical/voltage level, indicating that no digital product is connected. When pole G of MOSFET N is at a high voltage level, MOSFET N is on and LED 1 is lit. When pole G of MOSFET P is at a high voltage level, MOSFET P is off and LED5 is off. When any digital product is connected, the pin connected to SCM as shown in FIG. 3 will detect a low voltage level, indicating that the digital product is connected, and the system enters the theft-prevention state. When pole G of MOSFET N is at a low electrical level, MOSFET N is off and LED1 is off. When pole G of MOSFET P is at a low electrical level, MOSFET P is on and LED 5 is lit.

Figure 5:
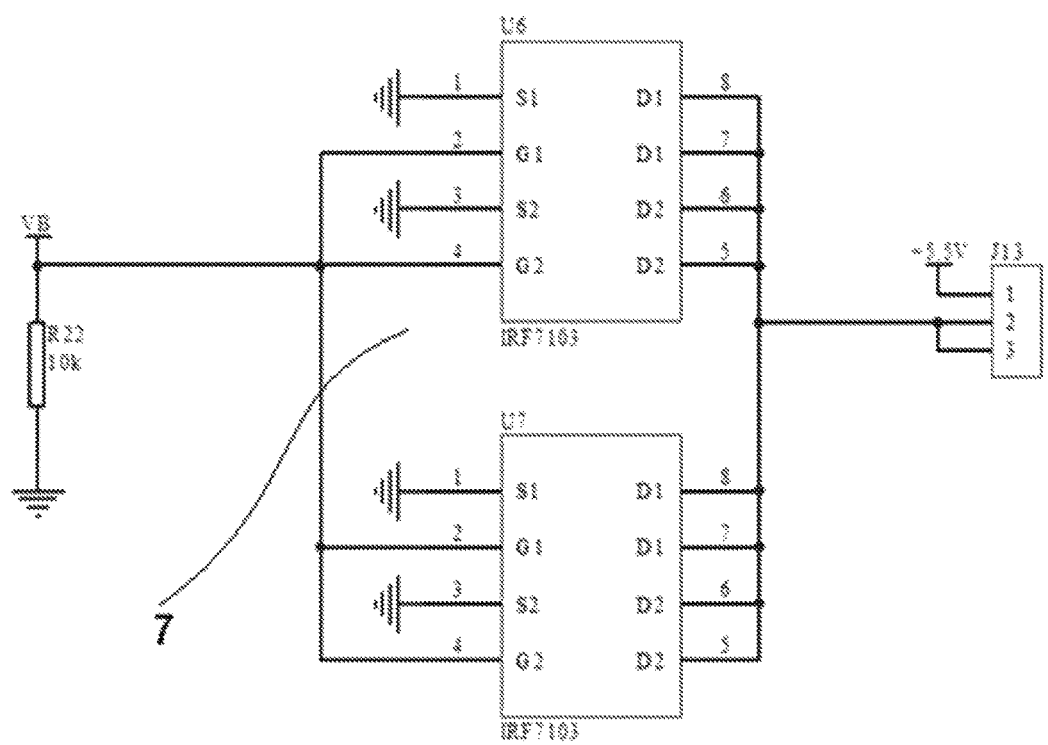
FIG. 5 shows a circuit diagram of a charging control circuit of one embodiment of the invention.

In accordance with embodiments of the invention, each sub-control may comprise a charging control circuit. As is shown in FIG. 5, each sub-control 2 comprises a charging control circuit 7, which comprises a resistor R22, IRF7103 chips U6, U7 and an adapter interface J13; one terminal of resistor R22 is grounded; the adapter interface J13 comprises pins 1, 2 and 3. Pins 2 and 3 are short connected for connection with pin 5-8 of IRF7103 chips U6 and U7, respectively. Pin 1 of adapter interface J13 is connected to a power source (e.g., a 5V power source).

Pins 1 and 3 of IRF7103 chips U6 and U7 are grounded. The other terminal of resistor R22 and pins 2 and 4 of IRF7103 chips U6 and U7 are connected to the data wire.

When no data wire is connected, control poles G of IRF7103 chip U6 and U7 are at a low electrical level because the resistor R22 is grounded, and chips U6 and U7 are off. No current loop is formed because one terminal (positive pole) of the adapter is connected to a 5V power source, while the other terminal is connected to chips U6 and U7, which are off. As a result, the display product is not being charged. When the data wire is connected, a high electrical level is produced at one end of resistor R22, and control poles G of IRF7103 chip U6 and U7 are also at the high electrical level. Therefore, chips U6 and U7 are on, and the negative pole of the adapter is connected to form a power loop, which is used to charge the display product.

Figure 6:
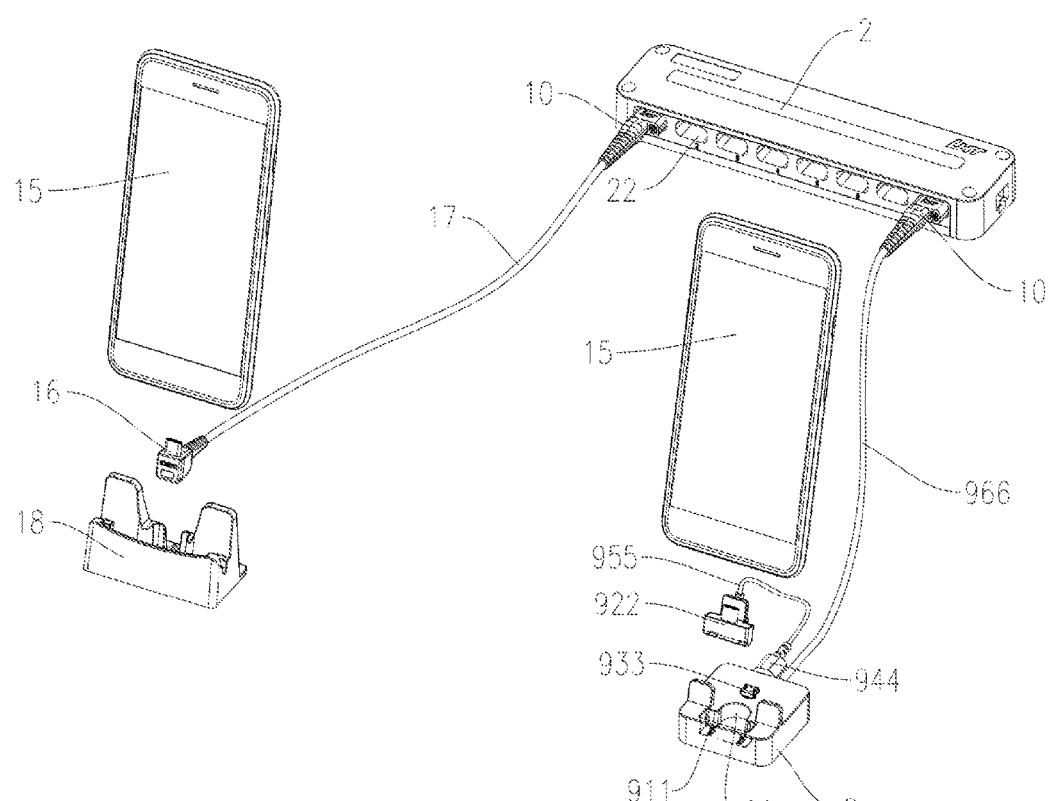
FIG. 6 shows a structural diagram of the charging stand of one embodiment of the invention.

As is shown in FIG. 6, in accordance with some embodiments, a sub-control 2 connects with a charging stand 9 via a charging cable 966. The charging stand 9 has a groove 91, where an electrode assembly 911 may electrically connect with a mini plug 922, which in turn connects with a display product 15. Alternatively, the mini plug 922 connects with the display product 15 and also connects, via a cable 955 (optionally with a plug 944 at the other end of cable 955) to the charging stand 9. The charging line (charging cable) 966 (from the sub-control 2) is connected to the electrode assembly 911. The charging line 966 may connect with the sub-control 2 via an interface 10 (e.g., an USB interface).

As is shown in FIG. 6, in accordance with some embodiments, the system may use a charging stand (display stand) 18 that is connected to a sub-control 2 via a charging cable 17, which has an interface 16 at one end for connection with a display product 15 (e.g., a cell phone) and another interface 10 at the other end for connection with a sub-control 2. In this embodiment, the interface 16 may fit in a charging stand (display stand) 18 such that the display product 15 (e.g., a cell phone) is displayed while being charged. The interfaces 16 and 10 may be any suitable connection interface, such as an USB interface. The charging stand 18 also functions as a display stand for a display item (e.g., a mobile phone) 15.

In accordance with some embodiments of the invention, the charging stands on both sides of the groove may be provided with cavities filled with roller balls. Both walls of the groove may be made of an elastic material.

In accordance with some embodiments of the invention, the wireless receiver may be a 2.4 G wireless receiver or an RFID wireless receiver.

The operation of an embodiment of the invention may be as follows:

As is shown in FIGS. 1 and 2, the main control 1 makes use of data wire 4 to connect one sub-control 2; the sub-control 2 is connected to other sub-controls 2 via data wires in series, e.g., connecting 8 sub-controls 2 in this particular example.

SCM 21 of each sub-control 2 detects a voltage signal at each interface. For example, when a display product is connected to the third and fourth interfaces of the eighth (8th) sub-control, the SCM of the 8th sub-control will send information that "a display product is connected at the third and fourth interfaces" to the seventh (7th) sub-control. The 7th sub-control will then relay the information to the 6th sub-control. The information is similarly relayed up the chain. The information that "a digital product is connected" will finally reach the main control 1 for recording and/or display.

When the 3rd interface is connected to the product support (e.g., the charging stand 9 in FIG. 6) via a charging line (or charging cable), the charging plug on the product support may be used to charge the display product and the status indicator lamp is lit (e.g., a blue light).

When the charging line/cable is disconnected from the digital product, SCM of the 8th sub-control will send the information that "the 3rd interface is disconnected from the display product" to the 7th sub-control, and the 7th sub-control will then relay the information to the 6$^{th}$ sub-control. The information is relayed in turn in a similar manner. Finally, the information that "the 3rd interface is disconnected from the display product" will reach the main control to record and display the information, and to trigger an alarm. Meanwhile, status indicator lamp on the charging line will display in red.

In accordance with some embodiments of the invention, a remote control may be used to send unlocking information to the processor. The wireless receiver will receive the unlocking information; thereby the processor will control the alarm to stop the alarm.

It is to be understood that the above embodiments are only used to illustrate the invention, and should not be used to restrict its scope. It is to be further understood that one skilled in the art can make various alterations or modifications to the invention after reading of the contents described herein. Similarly, such equivalent forms also fall within the scope of the invention, as defined by the attached claims.

What is claimed is:

1. A centralized theft-proof device, comprising:
    a main control, several sub-controls, and optionally a remote control;
    wherein the main control comprises a processor, a display, a wireless receiver, and an alarm,
    wherein each sub-control of the several sub-controls comprises a single-chip microcomputer (SCM) and a plurality pairs of interfaces electrically connected to the SCM,
    wherein the processor and the SCM are in series connection,
    wherein the processor is electrically connected to the display, wireless receiver, and alarm respectively, and
    wherein the main control is connected to a first one of the several sub-controls via an adaptor and the each sub-control of the several sub-controls are connected in series via the adaptor.

2. The centralized theft-proof device according to claim 1, wherein an interface on one of the several sub-controls is connected to one end of a charging cable, and the other end of the charging cable is configured to connect, either directly or indirectly via a charging stand, with a display product.

3. The centralized theft-proof device according to claim 2, wherein the each sub-control of the several sub-controls further comprises a charging line detection circuit, which comprises a first resistor, a second resistor, and a capacitor,
    wherein the second resistor is electrically connected to one terminal of the first resistor and the capacitor, respectively,
    wherein the other terminal of the capacitor is grounded,
    wherein the other terminal of the first resistor is connected to a power source, and
    wherein a junction of the first resistor and the second resistor is connected to the charging line connecting with the SCM of the sub-control, and a junction of the first resistor and the capacitor is connected to the charging line.

4. The centralized theft-proof device according to claim 3, wherein the each sub-control of the several sub-controls further comprises a charging status indication circuit; the charging status indication circuit comprises a first LED, a second LED, a third resistor R1, a fourth resistor R5, a MOSFET N and a MOSFET P;
    wherein pole S of MOSFET N and pole S of MOSFET P are grounded,
    wherein terminals of the first LED are, respectively, connected to one terminal of the third resistor R1 and pole D of MOSFET N,
    wherein terminals of the second LED are, respectively, connected to one terminal of the fourth resistor R5 and pole D of MOSFET P,
    wherein the third resistor R1 and the fourth resistor R5 are connected to a second power source, and
    wherein pole G of MOSFET P is connected to pole G of MOSFET N and then connect to the charging line.

5. The centralized theft-proof device according to claim 2, wherein the each sub-control of the several sub-controls further comprises a charging control circuit, which comprises a fifth resistor, an IRF7103 chip U6, an IRF7103 chip U7 and an adapter interface J13;
    wherein one terminal of the fifth resistor is grounded,
    wherein the adapter interface J13 comprises pins 1, 2 and 3, among which pins 2 and 3 are short connected for connection with pins 5 to 8 of IRF7103 chips U6 and U7, and pin 1 of the adapter interface J13 is connected to a power source,
    wherein Pins 1 and 3 of IRF7103 chips U6 and U7 are grounded, and
    wherein the other terminal of fifth resistor and pins 2 and 4 of IRF7103 chips U6 and U7 are connected to a data wire.

6. The centralized theft-proof device according to claim 2, further comprising a charging stand having a groove, and an electrode assembly provided in the groove, wherein the electrode assembly is electrically connected to a display product via a mini plug, and a charging line is connected to the electrode assembly.

7. The centralized theft-proof device according to claim 6, wherein both side walls of the groove of the charging stand are provided with cavities, in which roller balls are provided, and both side walls of the groove are made of an elastic material.

8. The centralized theft-proof device according to claim 1, wherein the wireless receiver is a 2.4G wireless receiver or an Radio Frequency Identification Device (RFID) wireless receiver.

\* \* \* \* \*